US006927184B1

(12) United States Patent
Jacobs-Hartwig et al.

(10) Patent No.: US 6,927,184 B1
(45) Date of Patent: Aug. 9, 2005

(54) METHOD OF PRODUCING MICROFIBER NONWOVENS THAT CONTAIN CYCLOOLEFIN POLYMERS

(75) Inventors: Alexandra Jacobs-Hartwig, Niedernhausen (DE); Wilfried Hatke, Kelkheim (DE); Donal McNally, Chatham, NJ (US); Ronald R. Lamonte, Flanders, NJ (US)

(73) Assignee: Ticona GmbH, Kelsterbach (DE)

( * ) Notice: Subject to any disclaimer, the term of this patent is extended or adjusted under 35 U.S.C. 154(b) by 31 days.

(21) Appl. No.: 10/030,217

(22) PCT Filed: Jun. 21, 2000

(86) PCT No.: PCT/EP00/05760

§ 371 (c)(1),
(2), (4) Date: Apr. 9, 2002

(87) PCT Pub. No.: WO01/02635

PCT Pub. Date: Jan. 11, 2001

(30) Foreign Application Priority Data

Jul. 5, 1999 (DE) ................................ 199 30 979

(51) Int. Cl.[7] ............................................. D04H 1/56
(52) U.S. Cl. ..................................................... 442/400
(58) Field of Search ........................................ 442/400

(56) References Cited

U.S. PATENT DOCUMENTS

| 5,709,921 A | * | 1/1998 | Shawver ..................... 428/152 |
| 5,853,457 A | | 12/1998 | Eysmondt et al. ............ 95/138 |
| 5,853,881 A | * | 12/1998 | Estey et al. .................. 428/373 |
| 5,880,241 A | * | 3/1999 | Brookhart et al. .......... 526/348 |
| 5,952,252 A | * | 9/1999 | Shawver et al. ............ 442/407 |
| 6,103,647 A | * | 8/2000 | Shultz et al. ................ 442/346 |
| 6,362,389 B1 | * | 3/2002 | McDowall et al. ......... 604/367 |
| 2002/0052585 A1 | * | 5/2002 | Thomas et al. .............. 604/370 |

FOREIGN PATENT DOCUMENTS

| DE | 4429165 | 2/1996 |
| JP | 06330445 | 11/1994 |
| JP | 08041260 | 2/1996 |
| WO | 9623010 | 8/1996 |

* cited by examiner

Primary Examiner—Bernard Lipman
(74) Attorney, Agent, or Firm—Michael W. Ferrell

(57) ABSTRACT

Microfiber webs comprising at least one cycloolefin polymer are produced by melt-blowing.

5 Claims, No Drawings

METHOD OF PRODUCING MICROFIBER NONWOVENS THAT CONTAIN CYCLOOLEFIN POLYMERS

The present invention relates to a process for producing microfiber webs comprising cycloolefin polymers and to the use of the microfiber webs.

EP 594 123 describes microfiber webs in the electret state which comprise acyclic polyolefins, preferably polypropylene, and were produced by melt-blowing.

EP 705 931 discloses electret fiber blend webs which are electrostatically charged in a specific manner, for example in a corona discharge, for use as filter materials and include charge control agents to increase the charge stability.

WO 98/56836 discloses electrets based on cycloolefin copolymers. They are notable for the long-term stability of the applied charges, even at high temperatures and high relative humidity. Also disclosed are blends with polyolefins, for example polypropylene.

Processes for producing microfiber webs by meltblowing are described in U.S. Pat. No. 3,978,185; U.S. Pat. No. 3,972,759; and U.S. Pat. No. 4,622,259.

It is an object of the present invention to provide an economical and environmentally friendly process for producing microfiber webs comprising cycloolefin polymers. The process of the invention will now be more particularly described.

The invention is to produce microfiber webs comprising cycloolefin polymers by melt-blowing. The melt-blowing process of the invention results in microdenier fibers with diameters of 0.1 to 20 µm, preferably 0.5 to 7 µm. The fibers produced by the melt-blowing process are consequently approximately an order of magnitude smaller than the smallest diameter of fibers produced by spinbonding. The spinbonding process is in principle likewise suitable for producing microfiber webs comprising cycloolefin polymers, but because of the other fiber characteristics, for example fiber diameter, is used for producing other web styles.

In the melt-blowing process, the fiber-forming cycloolefin polymer is melted in an extruder and brought to the appropriate temperature and extruded through an array of a multiplicity of extrusion orifices into a high velocity hot air stream. The rapidly moving hot air attenuates the melt streams, creating fibers in the microdenier region. The die arrangement is generally a linear array of capillaries having a small diameter. Typical hole diameters range from 0.25 to 0.5 millimeters. The air stream impinges on the melt filaments extruded by the holes from both sides. The air stream can have a temperature of 100 to 300° C. The ambient air drawn into the hot air stream cools the hot gas and solidifies the fibers.

Extrusion conditions and also air stream temperature and velocity may be adapted to the flowability of the cycloolefin polymer in order that the process or web quality may be optimized.

The fibers are deposited on a conveyor as a web. The entanglement of the fibers and the fiber-to-fiber cohesion confers sufficient strength on the web for it to be handleable without further consolidation.

The web may in principle also be further consolidated in any known manner. For example, the web may be consolidated using a binder with which the web is impregnated and which is subsequently cured, or the binder may be a fusible binder which is incorporated into the web, for example in powder form or in the form of binder threads, and which on heating consolidates the web into a nonwoven fabric.

The web may also be consolidated mechanically, for example by needling or hydromechanically, for example as described in EP-A-0 108 621. The various consolidation techniques may also be combined, if desired.

Instead of being deposited on a conveyor, the fibers may also be deposited on a spun but not bonded web and, if desired, subsequently thermally consolidated and bonded. This technique may also be used to create sandwich structures from different webs.

Microfiber webs are produced by the process according to the invention using at least one cycloolefin polymer containing polymerized units derived from at least one cyclic, especially polycyclic, olefin and optionally at least one acyclic-olefin.

The term cycloolefin polymer encompasses cycloolefin copolymers as well as cycloolefin homopolymers.

The inventive process for producing microfiber webs is carried out using at least one cycloolefin polymer containing 0.1 to 100% by weight, preferably 0.1 to 99.9% by weight, particularly preferably 3 to 75 mol %, based on the total mass of the cycloolefin polymer, of polymerized units derived from at least one polycyclic olefin of the formulae I, II, II', III, IV, V or VI

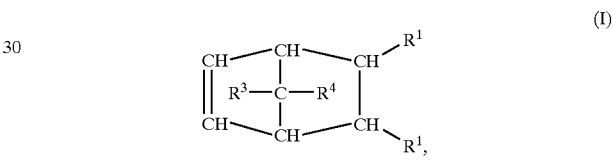

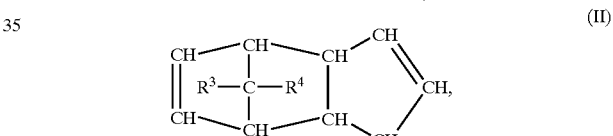

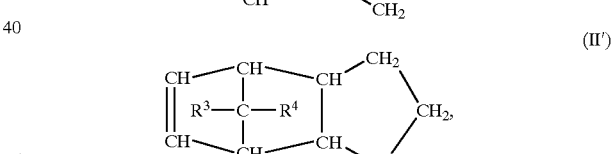

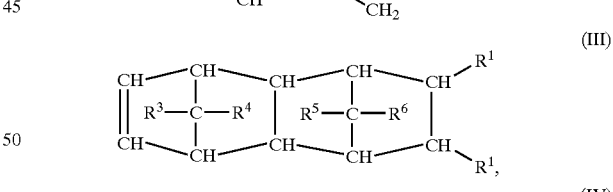

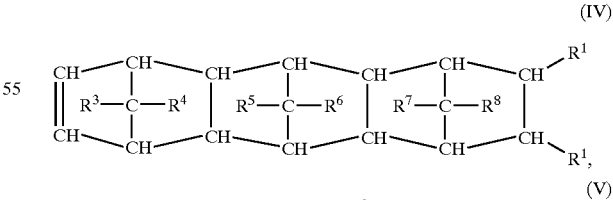

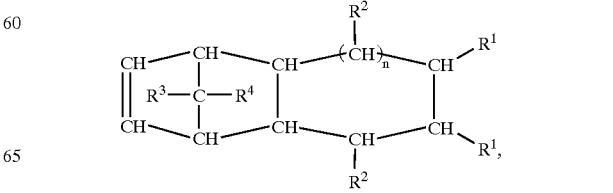

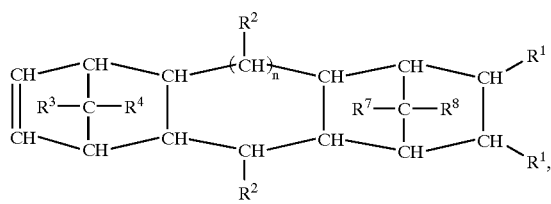
(VI)

where $R^1$, $R^2$, $R^3$, $R^4$, $R^5$, $R^6$, $R^7$ and $R^8$, which may be the same or different, are each a hydrogen atom or a $C_1$–$C_{20}$ hydrocarbyl radical, such as a linear or branched $C_1$–$C_8$ alkyl radical, $C_6$–$C_{18}$ aryl radical, $C_7$–$C_{20}$ alkylenearyl radical, a cyclic or acyclic $C_2$–$C_{20}$ alkenyl radical, or form a saturated, unsaturated or aromatic ring, subject to the proviso that the same $R^1$ to $R^8$ may have different meanings in the various formulae I to VI, and n is from 0 to 5, and 0 to 99.9% by weight, preferably 0.1 to 99.9% by weight, particularly preferably 5 to 80 mol %, based on the total mass of the cycloolefin polymer, of polymerized units derived from one or more acyclic olefins of the formula VII

(VII)

where $R^9$, $R^{10}$, $R^{11}$ and $R^{12}$, which may be the same or different, are each a hydrogen atom or a linear, branched or saturated or unsaturated $C_1$–$C_{20}$ hydrocarbyl radical such as a $C_1$–$C_8$ alkyl radical or a $C_6$–$C_{18}$ aryl radical.

The cyclic olefins also include derivatives of these cyclic olefins having polar groups such as halogen, hydroxyl, ester, alkoxy, carboxyl, cyano, amido, imido or silyl groups.

The cycloolefin polymers used in the inventive process for producing microfiber webs may also contain 0 to 45% by weight, based on the overall composition of the cycloolefin polymer, of polymerized units derived from one or more monocyclic olefins of the formula VIII

(VIII)

where m is from 2 to 10.

Preferred cycloolefin polymers for the purposes of the present invention contain polymerized units derived from polycyclic olefins of the formula I or III and polymerized units derived from acyclic olefins of the formula VII.

Particular preference is given to cycloolefin polymers containing polymerized units derived from olefins having a norbornene-based structure, most preferably from norbornene and tetracyclododecene and optionally vinylnorbornene or norbornadiene. Particular preference is also given to cycloolefin polymers containing polymerized units derived from acyclic olefins having terminal double bonds such as α-olefins of 2 to 20 carbon atoms, most preferably ethylene or propylene. Special preference is given to norbornene/ethylene and tetracyclododecene/ethylene copolymers.

The cycloolefin polymers may be produced by heterogeneous or homogeneous catalysis with organometallic compounds that is described in a multiplicity of patents.

The cycloolefin polymers used according to the invention may be produced at temperatures of –78 to 200° C. and a pressure of 0.01 to 200 bar in the presence of one or more catalyst systems including at least one transition metal compound and optionally a cocatalyst and optionally a carrier material. Useful transition metal compounds include metallocenes, especially stereorigid metallocenes. Examples of catalysts useful for producing the cycloolefin polymers of the invention are described in EP-A-407 870, EP-A-485 893 and EP-A-503 422, all incorporated herein by reference.

The cycloolefin polymers used according to the invention may be produced using a metallocene as transition metal compound and an aluminoxane.

Examples of transition metal compounds used are:
rac-dimethyl-bis-(1-indenyl)-zirconium dichloride,
rac-dimethylgermyl-bis-(1-indenyl)-zirconium dichloride,
rac-phenylmethylsilyl-bis-(1-indenyl)-zirconium dichloride,
rac-phenylvinylsilyl-bis-(1-indenyl)-zirconium dichloride,
1-silacyclobutyl-bis(1-indenyl)-zirconium dichloride,
rac-diphenylsilyl-bis(1-indenyl)-hafnium dichloride,
rac-phenylmethylsilyl-bis-(1-indenyl)-hafnium dichloride,
rac-diphenylsilyl-bis-(1-indenyl)-zirconium dichloride,
tac-ethylene-1,2-bis-(1-indenyl)-zirconium dichloride,
dimethylsilyl-(9-fluorenyl)-(cyclopentadienyl)-zirconium dichloride,
diphenylsilyl-(9-fluorenyl)-(cyclopentadienyl)-zirconium dichloride,
bis(1-indenyl)-zirconium dichloride,
diphenylmethylene-(9-fluorenyl)-cyclopentadienylzirconium dichloride
isopropylene-(9-fluorenyl)-cyclopentadienyl-zirconium dichloride,
rac-isopropylidene-bis-(1-indenyl)zirconium dichloride,
phenylmethylmethylene-(9-fluorenyl)-cyclopentadienyl-zirconium dichloride,
isopropylene-(9-fluorenyl)-1-(1-(3-isopropyl)cyclopentadienyl)-zirconium dichloride,
isopropylene-(9-fluorenyl)(1-(3-methyl)cyclopentadienyl)-zirconium dichloride,
diphenylmethylene-(9-fluorenyl)(1-(3-methyl)cyclopentadienyl)-zirconium dichloride,
methylphenylmethylene-(9-fluorenyl)(1-(3-methyl)cyclopentadienyl)-zirconium dichloride,
dimethylsilyl-(9-fluorenyl)(1-(3-methyl)-cyclopentadienyl)-zirconium dichloride,
diphenylsilyl-(9-fluorenyl)(1-(3-methyl)cyclopentadienyl)-zirconium dichloride,
diphenylmethylene-(9-fluorenyl)(1-(3-tert-butyl)cyclopentadienyl)-zirconium dichloride,
isopropylene-(9-fluorenyl)(1-(3-tert-butyl)cyclopentadienyl)-zirconium dichloride,
isopropylene-(cyclopentadienyl)-(1-indenyl)-zirconium dichloride,
diphenylcarbonyl-(cyclopentadienyl)-(1-indenyl)-zirconium dichloride,
dimethylsilyl-(cyclopentadienyl)-(1-indenyl)-zirconium dichloride,
isopropylene-(methylcyclopentadienyl)-(1-indenyl)-zirconium dichloride,
4-($\eta^5$-cyclopentadienyl)-4,7,7-trimethyl-($\eta^5$-4, 5, 6, 7-tetrahydroindenyl)-zirconium dichloride,

[4-($\eta^5$-cyclopentadienyl)-4,7,7-triphenyl-($\eta^5$-4,5,6,7-tetrahydroindenyl)]zirconium dichloride,
[4-($\eta^5$-cyclopentadienyl)4,7-dimethyl-7-phenyl-($\eta^5$-4, 5,6,7-tetrahydroindenyl)]zirconium dichloride,
[4-($\eta^5$-3'-tert-butylcyclopentadienyl)4,7,7-triphenyl-($\eta^5$-4, 5,6,7-tetrahydroindenyl)]zirconium dichloride,
[4-($\eta^5$-3'-tert-butylcyclopentadienyl)-4,7-dimethyl-7-phenyl-($\eta^5$-4,5,6,7-tetrahydroindenyl)]zirconium dichloride,
[4-($\eta^5$-3'-methylcyclopentadienyl)-4,7,7-trimethyl-($\eta^5$-4,5,6,7-tetrahydroindenyl)]zirconium dichloride,
[4-($\eta^5$-3'-methylcyclopentadienyl)-4,7,7-triphenyl-($\eta^5$-4,5,6,7-tetrahydroindenyl)]zirconium dichloride,
[4-($\eta^5$-3'-methylcyclopentadienyl)-4,7-dimethyl-7-phenyl-($\eta^5$-4,5,6,7-tetrahydroindenyl)]zirconium dichloride,
[4-($\eta^5$-3'-isopropylcyclopentadienyl)-4,7,7-trimethyl-($\eta^5$-4,5,6,7-tetrahydroindenyl)]zirconium dichloride,
[4-($\eta^5$-3'-isopropylcyclopentadienyl)-4,7,7-triphenyl-($\eta^5$-4,5,6,7-tetrahydroindenyl)]zirconium dichloride,
[4-($\eta^5$-3'-isopropylcyclopentadienyl)-4,7-dimethyl-7-phenyl-($\eta^5$-4,5,6,7-tetrahydroindenyl)]zirconium dichloride,
[4-($\eta^5$-cyclopentadienyl)($\eta^5$-4,5-tetrahydropentalene)]zirconium dichloride,
[4-($\eta^5$-cyclopentadienyl)-4-methyl)($\eta^5$-4,5-tetrahydropentalene)]zirconium dichloride,
[4-($\eta^5$-cyclopentadienyl)-4-phenyl-($\eta^5$-4,5-tetrahydropentalene)]zirconium dichloride,
[4-($\eta^5$-cyclopentadienyl)-4-phenyl-($\eta^5$-4,5-tetrahydropentalene)]zirconium dichloride,
[4-($\eta^5$-3'-methyl-cyclopentadienyl)($\eta^5$-4,5-tetrahydropentalene)]zirconium dichloride,
[4-($\eta^5$-3'-isopropylcyclopentadienyl)($\eta^5$-4,5-tetrahydropentalene)]zirconium dichloride,
[4-($\eta^5$-3'-benzyl-cyclopentadienyl)-($\eta^5$-4,5-tetrahydropentalene)]zirconium dichloride,
[2,2,4-trimethyl-4-($\eta^5$-cyclopentadienyl)-($\eta^5$-4,5-tetrahydropentalene)] zirconium dichloride,
[2,2,4-trimethyl-4-($\eta^5$-(3,4-diisopropyl)cyclopentadienyl)-($\eta^5$-4,5-tetrahydropentalene)] zirconium dichloride.

The cycloolefin polymers may also be prepared in other ways, which will now be briefly outlined. Catalyst systems based on mixed catalysts composed of titanium salts and organoaluminums are described in DD-A-109 224 and DD-A-237 070. EP-A-156 464 describes the production using catalysts based on vanadium. EP-A-283 164, EP-A-407 870, EP-A-485 893 and EP-A-503 422 describe the production of cycloolefin polymers using catalysts based on soluble metallocene complexes. All these patents are incorporated herein by reference for the processes and catalyst systems used for producing cycloolefin polymers.

The cycloolefin polymers used according to the invention may also be produced by homo- and/or copolymerization of cyclic, preferably polycyclic, olefins with ring retention.

The cycloolefin polymers may also be produced by ring-opening polymerization of at least one of the monomers of the formulae I to VI and subsequent hydrogenation of the products obtained. If desired, the cycloolefin polymers may also be produced by ring-opening copolymerization of at least one of the monomers of the formulae I to VI with further, for example monocyclic, monomers of the formula VIII and subsequent hydrogenation of the products obtained. The production of cycloolefin polymers is described in the Japanese patents 3-14882, 3-122137, 4-63807, 2-27424 and 2-276842, which are all incorporated herein by reference for the processes and catalyst systems used for producing cycloolefin polymers. Also included are derivatives of these cyclic olefins having polar groups, such as halogen, hydroxyl, ester, alkoxy, carboxyl, cyano, amido, imido or silyl groups.

Hydrogenated polymers and copolymers, as, for example, of styrene and dicyclopentadiene, are likewise expressly suitable and are herein likewise classed as cycloolefin polymers.

The polymerization may also be carried out in more than one stage, in which case block copolymers may be formed (DE-A-42 05 416).

Cycloolefin polymers are preferably amorphous, transparent and colorless materials of construction. The heat resistance of cycloolefin polymers can be varied within wide limits. The heat resistance determined by ISO 75 Part 2 and Part 2 on injection moldings may be gauged for cycloolefin polymers from their glass transition temperatures. The cycloolefin polymers described have glass transition temperatures between −50 and 220° C. Preference is given to glass transition temperatures between 0 and 180 C, particularly to glass transition temperatures between 40 and 180 C.

The average molar mass of cycloolefin polymers may be controlled in known manner by hydrogen metering, variation of the catalyst concentration or variation of the temperature. The cycloolefin polymers comprised in the microfiber webs produced by the process according to the invention have mass average molar masses Mw between 1000 and 10,000,000 g/mol. Preference is given to mass average molar masses Mw between 5000 and 5,000,000 g/mol, particularly between 10,000 and 1,200,000 g/mol.

The cycloolefin polymers comprised in the microfiber webs produced by the process of the invention have viscosity numbers between 5 and 1000 ml/g. Preference is given to viscosity numbers between 20 and 500 ml/g, particularly between 30 and 300 ml/g.

The processing of the cycloolefin polymers according to the process of the invention is effected at temperatures of 50 to 200° C. above HDT/B (Heat distortion temperature), preferably at 80 to 180° C. above HDT/B, particularly preferably at 100 to 160° C. above HDT/B.

The microfiber web production process of the invention is preferably carried out using an air stream at 70 to 250° C. above HDT/B (Heat distortion temperature), particularly preferably at 100 to 200° C. above HDT/B, most preferably at 120 to 170° C. above HDT/B.

The flowability of the cycloolefin polymers used for the process of the invention influences process procedure and web quality. The process of the invention is accordingly advantageously carried out using cycloolefin polymers having an MVR of 1 to 300 ml/10 min, preferably of 2 to 200 ml/10 min, particularly preferably of 5 to 80 ml/10 min.

Extrusion conditions and also air stream temperature and velocity may be adapted to the flowability of the cycloolefin polymer in order that the process or web quality may be optimized.

The process of the invention is particularly useful for producing microfiber webs of high quality. The process of the invention does not give rise to significant amounts of loose fibers or fiber fragments, ie fly. In processes not according to the invention, these loose fibers or fiber fragments may lead to process upsets and web defects.

Microfiber webs may also be produced by the process of the invention using alloys of at least one cycloolefin polymer and at least one further polymer in any desired blend ratio.

Alloys with cycloolefin polymers are preferably formable using the following polymers: polyethylene, polypropylene, ethylene-polypropylene copolymers, polybutylene, poly(4-methyl-1-pentene), polyisoprene, polyisobutylene, natural rubber, poly(1-methylene methacrylate), further polymethacrylates, polyacrylate, acrylate-methacrylate copolymers, polystyrene, stryene-acrylonitrile copolymer, bisphenol A-polycarbonate, further polycarbonates, aromatic polyester carbonates, polyethylene terephthalate, polybutylene terephthalate, amorphous polyacrylate, nylon-6, nylon-6,6, further polyamides, polyaramids, polyether ketones, polyoxymethylene, polyoxyethylene, polyurethanes, polyether sulfones, polyvinylidene fluoride.

Alloys of cycloolefin polymers and polyolefins are preferably formed using the following polyolefins: homopolymers of ethylene and propylene and copolymers of these two monomers, copolymers based on ethylene with linear or branched olefins, such as butene, pentene, hexene, heptene, octene, nonene, decene, undecene and dodecene, copolymers based on propylene with linear or branched olefins, such as butene, pentene, hexene, heptene, octene, nonene, decene, undecene and dodecene, terpolymers of ethylene, propylene and linear or branched olefins, such as butene, pentene, hexene, heptene, octene, nonene, decene, undecene and dodecene.

The alloys may be produced by customary processes, for example by coextrusion of the polymer components from the melt, with or without the use of further additives, and subsequent pelletization.

The process of the invention can be carried out using additives in customary amounts, for example plasticizers, UV stabilizers, optical brighteners, antioxidants, antistats, heat stabilizers. The additives mentioned may have been added before the processing of the polymer materials or else may be added during the processing.

It has been determined that the exact choice of airflow temperature and velocity has a marked influence on the number of loose fibers or fiber fragments produced. The process of the invention does not give rise to significant amounts of loose fibers or fiber fragments, ie fly, which may lead otherwise to process upsets and web defects.

In a particular embodiment of the process according to the invention, the microfiber webs are charged up electrostatically, for example by corona treatment or triboelectrically, and used as electrostatically charged microfiber webs, known as electrets.

The large quantity of very fine fibers in a microfiber web produced by the process according to the invention results in a structure having a very large surface area and small pore sizes.

The microfiber webs produced by the process according to the invention are notable for very good resistance to chemicals and moisture and for excellent long-term stability of the applied charges even at high temperatures and high relative humidity.

The basis weight of the microfiber webs produced by the process according to the invention depends on the intended use and may be specifically adjusted via the choice of material and of the processing conditions. The basis weight of the microfiber webs produced by the process according to the invention is between 1 and 300 g/m$^2$, preferably between 2 and 200 g/m$^2$, particularly preferably between 5 and 50 g/m$^2$.

The microfiber webs produced by the process according to the invention are therefore useful as oil absorbers, as filter materials, for example for capturing fine particles from gases or liquids, as hospital-medical products and as insulation materials.

The microfiber webs produced by the process according to the invention, particularly in the form of electrostatically charged microfiber webs, are useful as particle filters in the sector of aerospace and clean room technology, building and home services technology, for example as microfilters in vacuum cleaners, as passenger car interior filters and also in the respiratory protection sector, for example as particle-filtering breathing masks. A particular economic and safety aspect is that the excellent charge stability provides the microfiber webs produced according to the process of the invention with a sustained use life even under ambient conditions of comparatively high temperature and high relative humidity.

The MVR measurements are carried out according to ISO 1133 at $T_{MVR}$=HDT/B+115° C. and a mass of 2.16 kg.

The measurements for determining the HDT are carried out according to ISO 75 Part 1 and 2 (0.46 MPa).

The invention will now be more particularly described with reference to examples.

EXAMPLES

Example 1

Microfiber webs were produced using ®TOPAS cycloolefin polymer (Ticona GmbH, Frankfurt/Germany) having an MVR of 28 ml/10 min and HDT/B of 131° C.

The polymer was processed using a temperature profile of <80° C./235° C./245° C./255° C./die 265° C. and at various air stream temperatures and pressures.

A number of microfiber webs were obtained with different fiber sizes and basis weights.

| Run No. | Basis weight [g/m$^2$] | Average fiber diameter [µm] | Air temperature [° C.] | Air pressure [bar] |
|---------|------------------------|------------------------------|------------------------|---------------------|
| 1-1 | 39 | 3.7 | 285 | 0.5 |
| 1-2 | 45 | 5 | 278 | 0.5 |
| 1-3 | 50 | 6.5 | 271 | 0.3 |
| 1-4 | 53 | 7 | 268 | 0.3 |
| 1-5 | 60 | 10 | 260 | 0.2 |

Example 2

Microfiber webs were produced using a ®TOPAS cycloolefin polymer (Ticona GmbH, Frankfurt/Germany) having an MVR of 28 ml/10 min and HDT/B of 131° C.

The polymer was processed using a temperature profile of <80° C./245° C./255° C./265° C./die 270° C. and at various air stream temperatures and pressures.

A number of microfiber webs were obtained with different fiber sizes and basis weights.

| Run No. | Basis weight [g/m$^2$] | Average fiber diameter [µm] | Air temperature [° C.] | Air pressure [bar] |
|---------|------------------------|------------------------------|------------------------|---------------------|
| 2-1 | 18 | 1.9 | 294 | 0.7 |
| 2-2 | 26 | 2.8 | 290 | 0.6 |
| 2-3 | 32 | 3.1 | 283 | 0.6 |
| 2-4 | 43 | 4.7 | 275 | 0.5 |

What is claimed is:

1. A process for producing microfiber webs consisting essentially of a cycloolefin polymer by melt-blowing, wherein the cycloolefin polymer contains:
(a) 0.1–100% by weight, based on the total mass of the cycloolefin polymer, of polymerized units derived from at least one polycyclic olefin of the formulae I, II, II', III, IV, V or VI

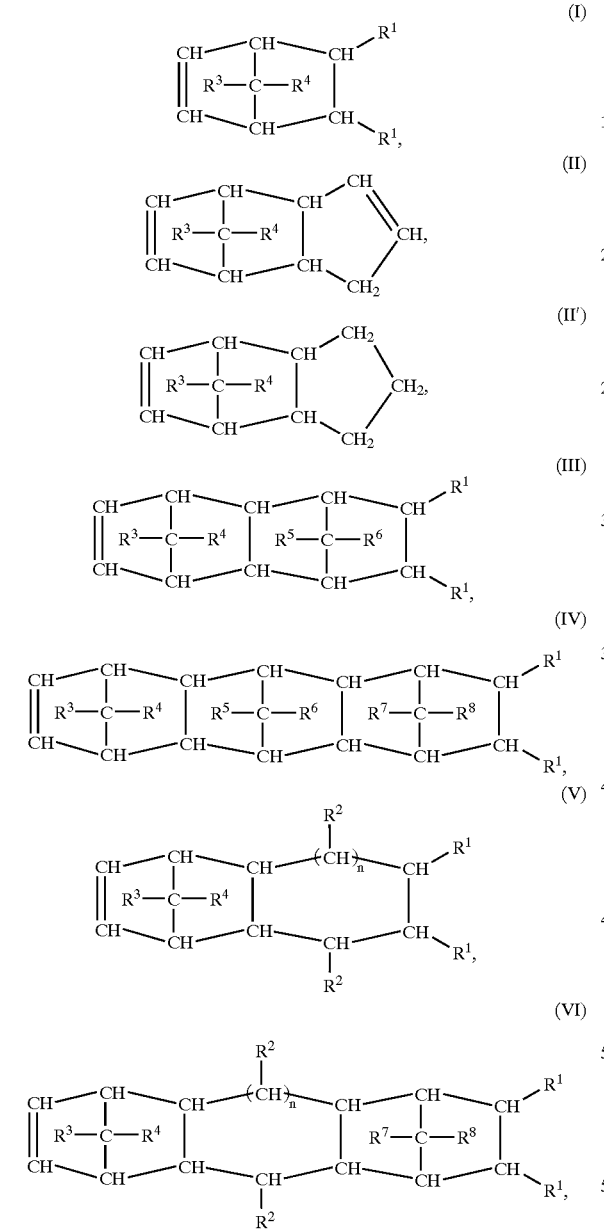

where $R^1$, $R^2$, $R^3$, $R^4$, $R^5$, $R^6$, $R^7$, and $R^8$, which may be the same or different, are each a hydrogen atom, a $C_1$–$C_{20}$ hydrocarbyl radical, or a cyclic or acyclic $C_2$–$C_{20}$ alkenyl radical, or form a saturated, unsaturated or aromatic ring, subject to the proviso that the same $R^1$ to $R^8$ may have different meanings in the various formulae I to VI, and n is from 0 to 5, and (b) 0 to 99.9% by weight, based on the total mass of the cycloolefin polymer, of polymerized units derived from one or more acyclic olefins of the formula VII $$\underset{R^{11}\phantom{xx}R^{12},}{\overset{R^{9}\phantom{xx}R^{10}}{C=C}} \quad (VII)$$

where $R^9$, $R^{10}$, $R^{11}$ and $R^{12}$, which may be the same or different, are each a hydrogen atom or a linear, branched or saturated or unsaturated $C_1$–$C_{20}$ hydrocarbyl radical, and (c) 0 to 45% by weight, based on the overall composition of the cycloolefin polymer, of polymerized units derived from one or more monocyclic olefins of the formula VIII $$\underset{(CH_2)_m}{HC=CH,} \quad (VIII)$$

where m is from 2 to 10.

2. The process according to claim 1, wherein the $C_1$–$C_{20}$ hydrocarbyl radical of groups $R^1$, $R^2$, $R^3$, $R^4$, $R^5$, $R^6$, $R^7$ and $R^8$ is each independently selected from the group consisting of a linear $C_1$–$C_8$ alkyl radical, a branched $C_1$–$C_8$ alkyl radical, a $C_6$–$C_{18}$ aryl radical, and a $C_7$–$C_{20}$ alkylenearyl radical.

3. The process according to claim 1, wherein the $C_1$–$C_{20}$ hydrocarbyl radical of groups $R^9$, $R^{10}$, $R^{11}$ and $R^{12}$ is each independently selected from the group consisting of a $C_1$–$C_8$ alkyl radical and a $C_6$–$C_{18}$ aryl radical.

4. The process according to claim 1, wherein said cycloolefin polymer consists essentially of the residue of norbornene and ethylene.

5. The process according to claim 1, wherein said cycloolefin polymer consists essentially of the residue of tetracyclododecene and ethylene.

* * * * *